United States Patent
Andreica et al.

(10) Patent No.: US 12,235,921 B2
(45) Date of Patent: *Feb. 25, 2025

(54) CONTEXTUAL DEEP BOOKMARKING

(71) Applicant: GOOGLE LLC, Mountain View, CA (US)

(72) Inventors: Mugurel Ionut Andreica, Adliswil (CH); Gokhan H. Bakir, Bäch (CH); Tak Keung Cheng, Los Altos, CA (US); Marcin M. Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,753

(22) Filed: Nov. 7, 2023

(65) Prior Publication Data

US 2024/0070217 A1 Feb. 29, 2024

Related U.S. Application Data

(63) Continuation of application No. 17/891,805, filed on Aug. 19, 2022, now Pat. No. 11,829,433, which is a (Continued)

(51) Int. Cl.
    *G06F 16/955* (2019.01)
    *G06F 3/16* (2006.01)
    (Continued)

(52) U.S. Cl.
    CPC .......... *G06F 16/9562* (2019.01); *G06F 3/167* (2013.01); *G06F 16/9566* (2019.01);
    (Continued)

(58) Field of Classification Search
    None
    See application file for complete search history.

(56) References Cited

U.S. PATENT DOCUMENTS 6,243,445 B1 * 6/2001 Begeja ................ H04L 12/2856
                                                            370/352
7,313,525 B1   12/2007 Packingham et al.
(Continued)

FOREIGN PATENT DOCUMENTS

CN    101211364    7/2008
CN    102016502    4/2011
(Continued)

OTHER PUBLICATIONS

Azim, Tanzirul, Oriana Riva, and Suman Nath. "uLink: Enabling user-defined deep linking to app content." In Proceedings of the 14th Annual International Conference on mobile systems, applications, and services, pp. 305-318. 2016. (Year: 2016).*
(Continued)

*Primary Examiner* — Frank D Mills
(74) *Attorney, Agent, or Firm* — Gray Ice Higdon

(57) ABSTRACT

A computer-implemented method is described. The method includes a computing system receiving a first voice input from a user for generating a bookmark. Responsive to receiving the voice input, the computing system obtains a resource identifier associated with a resource page. The method includes the computing system storing the resource identifier as a bookmark in a bookmark index that is accessible in response to a request from a user device. The method further includes the computing system using the resource identifier, stored as the bookmark, to access the resource page. The computing system uses the resource identifier to access the resource page based on the request from the user device. The request is generated by the user device in response to the user device receiving a second voice input from the user.

20 Claims, 7 Drawing Sheets

Related U.S. Application Data continuation of application No. 17/073,735, filed on Oct. 19, 2020, now Pat. No. 11,423,113, which is a continuation of application No. 15/836,599, filed on Dec. 8, 2017, now Pat. No. 10,810,278.

(60) Provisional application No. 62/486,601, filed on Apr. 18, 2017.

(51) Int. Cl.
  | | |
  |---|---|
  | *G10L 15/22* | (2006.01) |
  | *G10L 15/26* | (2006.01) |
  | *G06F 40/134* | (2020.01) |

(52) U.S. Cl.
  CPC .............. *G10L 15/22* (2013.01); *G10L 15/26* (2013.01); *G06F 40/134* (2020.01); *G10L 2015/223* (2013.01)

(56) References Cited

U.S. PATENT DOCUMENTS

| | | | |
|---|---|---|---|
| 8,731,266 | B2 | 5/2014 | Strand |
| 8,869,032 | B2* | 10/2014 | Agarwal ................. G06F 3/167 715/728 |
| 9,195,477 | B1* | 11/2015 | Spencer .................. H04L 67/34 |
| 10,810,278 | B2 | 10/2020 | Andreica et al. |
| 11,423,113 | B2 | 8/2022 | Andreica et al. |
| 2003/0088422 | A1 | 5/2003 | Denenberg et al. |
| 2003/0144984 | A1 | 7/2003 | Dunbar |
| 2007/0168192 | A1 | 7/2007 | Peuziat et al. |
| 2008/0172364 | A1 | 7/2008 | Cucerzan et al. |
| 2008/0243517 | A1 | 10/2008 | Muschett et al. |
| 2008/0313215 | A1 | 12/2008 | Beker et al. |
| 2009/0327263 | A1 | 12/2009 | Maghoul |
| 2011/0252311 | A1 | 10/2011 | Kay et al. |
| 2013/0110815 | A1 | 5/2013 | Tankovich et al. |
| 2013/0117022 | A1* | 5/2013 | Chen ...................... G06N 5/041 704/235 |
| 2013/0117263 | A1 | 5/2013 | Lukose et al. |
| 2014/0006030 | A1* | 1/2014 | Fleizach ............... G06F 16/954 704/260 |
| 2015/0185985 | A1 | 7/2015 | Kang et al. |
| 2015/0379128 | A1 | 12/2015 | Chang et al. |
| 2016/0094654 | A1 | 3/2016 | Raman et al. |
| 2016/0328105 | A1* | 11/2016 | Chandra ............... G06F 3/0488 |
| 2016/0350136 | A1 | 12/2016 | Karlo et al. |
| 2017/0004209 | A1 | 1/2017 | Johl |
| 2017/0046180 | A1* | 2/2017 | Desineni ............. G06F 9/44521 |
| 2017/0192941 | A1 | 7/2017 | Glover et al. |
| 2018/0090135 | A1 | 3/2018 | Schlesinger et al. |
| 2018/0166072 | A1* | 6/2018 | Seksenov ................ G10L 15/22 |
| 2022/0391466 | A1 | 12/2022 | Andreica et al. |

FOREIGN PATENT DOCUMENTS

| | | |
|---|---|---|
| CN | 103119587 | 5/2013 |
| CN | 103400579 | 11/2013 |
| EP | 2728474 | 5/2014 |
| JP | 11184670 | 7/1999 |
| JP | H11184670 | 7/1999 |
| JP | 2002189732 | 7/2002 |
| JP | 2015114527 | 6/2015 |
| JP | 2017027339 | 2/2017 |
| WO | 2016157128 | 10/2016 |

OTHER PUBLICATIONS

Ma, Yun, Xuanzhe Liu, Ruogu Du, Ziniu Hu, Yi Liu, Meihua Yu, and Gang Huang. "DroidLink: Automated generation of deep links for Android apps." arXiv preprint arXiv:1605.06928 (2016). (Year: 2016).*

China National Intellectual Property Administration: Notice of Grant issued in Application No. 201880012374.1; 6 pages; dated Jul. 1, 2023.

Heim, J. et al., "User profiles for adapting speech support in the opera web browser to disabled users;" In Universal Access in Ambient Intelligence Environments, pp. 154-172; Springer, Berlin, Heidelberg; 2007.

Azim et al.; uLink: Enabling user-defined deep linking to app content: In Proceeding of the 14th Annual International Conference on Mobile Systems, Applications, and Services; pp. 305-318; dated 2016.

China National Intellectual Property Administration; Notification of First Office Action issued in Application No. 201880012374.1; 18 pages; dated Dec. 1, 2022.

European Patent Office: Intention to Grant issued in Application No. 18701893.2, 51 pages, dated Jun. 8, 2022.

Japan Patent Office: Decision To Reject the Amendments issued for Application No. 2019-544669 dated Jan. 4, 2022. 9 pages.

Korean Intellectual Property Office; Notice of Allowance issued in Application No. 1020217028741; 3 pages; dated Nov. 16, 2021.

Korean Intellectual Property Office; Decision of Dismissal of Amendment issued in Application No. 20197023245; 11 pages; dated Aug. 9, 2021.

Japanese Patent Office: Office Action issued for Application No. 2019-544669; 7 pages; dated May 24, 2021.

Korean Intellectual Property Office; Decision of Rejection issued in Application No. 1020197023245; 8 pages; dated May 12, 2021.

European Patent Office; Communication Pursuant to Article 94(3) EPC issued in Application No. 18701893.2; 8 pages; dated Mar. 25, 2021.

Intellectual Property India; Office Action issue in Application No. 201927030773; 6 pages; dated Feb. 4, 2021.

Korean Intellectual Property Office: Notice of Office Action issued for Application No. 10-2019-7023245 dated Oct. 30, 2020. 70 pages.

Japan Patent Office: Office Action issued for Application No. 2019-544669 dated Oct. 12, 2020. 7 pages.

Written Opinion issued in International Application No. PCT/US2018/013130 mailed Jul. 18, 2018. 6 Pages.

International Search Report and Written Opinion in International Application No. PCT/US2018/013130 mailed Feb. 23, 2018. 16 pages.

Poon et al., "Browsing the Web from a Speech-Based Interface," Proc. Of Human-Computer Interaction (JNTERACT'01), dated Jul. 9, 2001. 8 pages.

'Speakeasysolutions.com' [online] "Speakeasy Solutions Google Chrome Commands," Speakeasy Solutions dated Oct. 2011. [retrieved on Feb. 15, 2018] Retreived from Internet: URL<http://www.speakeasysolutions.comwp-content/uploads/2011/10/SeS_GoogleChrome_V11.0.pdf>, 3 Pages. Oct. 2011.

'stanfordnip.github.jo' [online] "Core NLP Annotators," Version 3.8.0, [retrieved on Dec. 8, 2017] Retrireved from Internet: URL<https://stanfordnip.github.io/CoreNLP/annotators.html> 3 Pages. 2017.

'www.ibm.com' [online] "Named Entity Recognition annotator," IBM Watson Explorer 10.0.0 [retrieved on Dec. 8, 2017] Retrieved from Internet: URL<https://www.ibm.com/support/knowledgecenter/SS8NLW_10.0.0/com.ibm.discovery.es.ta.doc/iiystasystem.htm> 2 pages. 2017.

Japan Patent Office: Decision of Rejection issued for Application No. 2019-544669 dated Jan. 4, 2022. 3 pages. Jan. 4, 2022.

* cited by examiner

CONTEXTUAL DEEP BOOKMARKING

FIELD

The present specification is related to mobile devices.

BACKGROUND

Websites and application resources can include any number of links, embedded files, and/or other information that may or may not be relevant to a user. In particular, users may detect sources of information or other resources that are directly relevant to an interest of the user. As such, users may desire expedited access to particularly relevant web-based or application resources.

The user may create a bookmark that stores an electronic link to relevant web-based or application content. The user can later access the bookmark to quickly navigate to the relevant content. In the context of computing systems, bookmarks can be created and stored either locally, or remotely, for subsequent access via an example electronic device.

SUMMARY

A computing system is described that includes a user device that receives voice input from a user and a computing server that interacts with the user device to store multiple bookmarks that are accessible by the user device. In particular, the described system receives a first voice input, e.g., a query, from the user by way of a voice input method of a user device. The query may be received by the system when the user views web-based content or application-specific content.

The system recognizes a voice input and generates multiple data elements that can include at least a transcription of a voice input spoken by a user and a resource identifier for the web-based or the application-specific content. A computing server of the system includes a bookmarks engine that receives the multiple data elements and uses the received data elements to generate a bookmark that is stored in a bookmark index of the bookmarks engine. A stored bookmark can be accessed by the user device in response to the user device receiving voice input from the user that specifies a command to launch a particular bookmark.

One aspect of the subject matter described in this specification can be embodied in a computer-implemented method. The method includes, receiving, by a computing system, a first voice input from a user for generating a bookmark; responsive to receiving the voice input, obtaining, by the computing system, a resource identifier associated with a resource page; storing, by the computing system, the resource identifier as a bookmark in a bookmark index that is accessible in response to a request from a user device; and using, by the computing system, the resource identifier stored as the bookmark to access the resource page based on the request from the user device, the request being generated by the user device in response to the user device receiving a second voice input from the user.

These and other implementations can each optionally include one or more of the following features. For example, in some implementations, the resource page is generated by a web-browser application, and the resource identifier is a uniform resource locator (URL) that provides a resource address for accessing the resource page. In some implementations, i) the resource page is generated by a native application installed on the user device, the native application being configured to store one or more deep-links in an application index, and ii) the resource identifier is a uniform resource locator (URL) for the resource page and is obtained from the application index comprising address data about the native application.

In some implementations, obtaining the resource identifier comprises: i) accessing the application index that stores the one or more deep-links associated with the native application, and ii) selecting, from the application index, a deep-link that indicates the URL for the resource page, the deep-link providing a resource address for accessing the resource page. In some implementations, i) the resource page is generated by a native application, other than a web-browser, that does not store one or more application deep-links to a native application index, and ii) the resource identifier provides an electronic address associated with a computing path to the resource page.

In some implementations, i) the resource page is generated by a particular type of application installed on the user device, and ii) the resource identifier is at least one of: a) data identifying a screen image of the resource page generated by the particular type of application, or b) a deep-link that provides a resource address for accessing the resource page of the particular type of application. In some implementations, the method further includes: detecting, by the computing system, pattern data based on analysis of application content associated with the particular type of application; and generating, by the computing system, the deep-link based on the pattern data.

In some implementations, i) the resource page is generated by a messaging application installed on the user device, and ii) the resource identifier is at least one of: a) data identifying a screen image of the resource page generated by the messaging application, or b) a deep-link that provides a resource address for accessing the resource page of the messaging application. In some implementations, the method further includes: detecting, by the computing system, pattern data based on analysis of two or more messages associated with the messaging application; and generating, by the computing system, the deep-link based on the pattern data.

In some implementations, receiving voice input from a user includes: receiving, by the computing system, context data comprising at least one of: a) a native application uniform resource locator (URL) that uniquely identifies the resource page as being generated by the native application, b) a web-browser application URL that uniquely identifies the resource page as being generated by the web-browser application, c) assist data generated by a virtual assistant application installed on the user device, or d) data identifying a screen image of the resource page.

In some implementations, the method further includes: generating, by the computing system, a template comprising data indicating at least a subset of the received context data; generating, by the computing system and based on the template, one of: a URL that corresponds to the resource identifier, or a deep-link that corresponds to the resource identifier; and using, by the computing system, the template, and one of the URL or the deep-link, to generate the bookmark for accessing the resource page.

In some implementations, the method further includes: determining, by the computing system, an identifier for the bookmark, where the identifier for the bookmark is determined based on the first voice input received by the computing device from the user. In some implementations, the identifier for the bookmark is a name of the bookmark, and the method further includes: modifying, by the computing system, the identifier for the bookmark, wherein modifying the identifier comprises renaming the bookmark.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments and can result in one or more of the following advantages. A computing system is described that enables enhanced generation, storage, and access of bookmarks stored in a local or non-local bookmark index. The described systems and methods enable bookmarks to be created in an expedited and computationally efficient manner based on voice input from a user.

For example, rather than a computing device receiving and processing multiple touch or physical inputs from a user, a single voice input can be used by a computing system to quickly obtain and store data associated with generating a bookmark. The computing system can utilize pre-existing data elements to efficiently obtain resource identifiers, e.g., URLs/deep-links, for creating the bookmark. The computing device can also leverage non-local computing logic of the system for analysis of data elements that are used for generation of the bookmarks.

The described systems and methods allows for minimized use of local computing device processors and memory such that processor efficiency is enhanced and processor/memory utilization can be expanded to other computations. Hence, overall computing device system bandwidth is improved.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
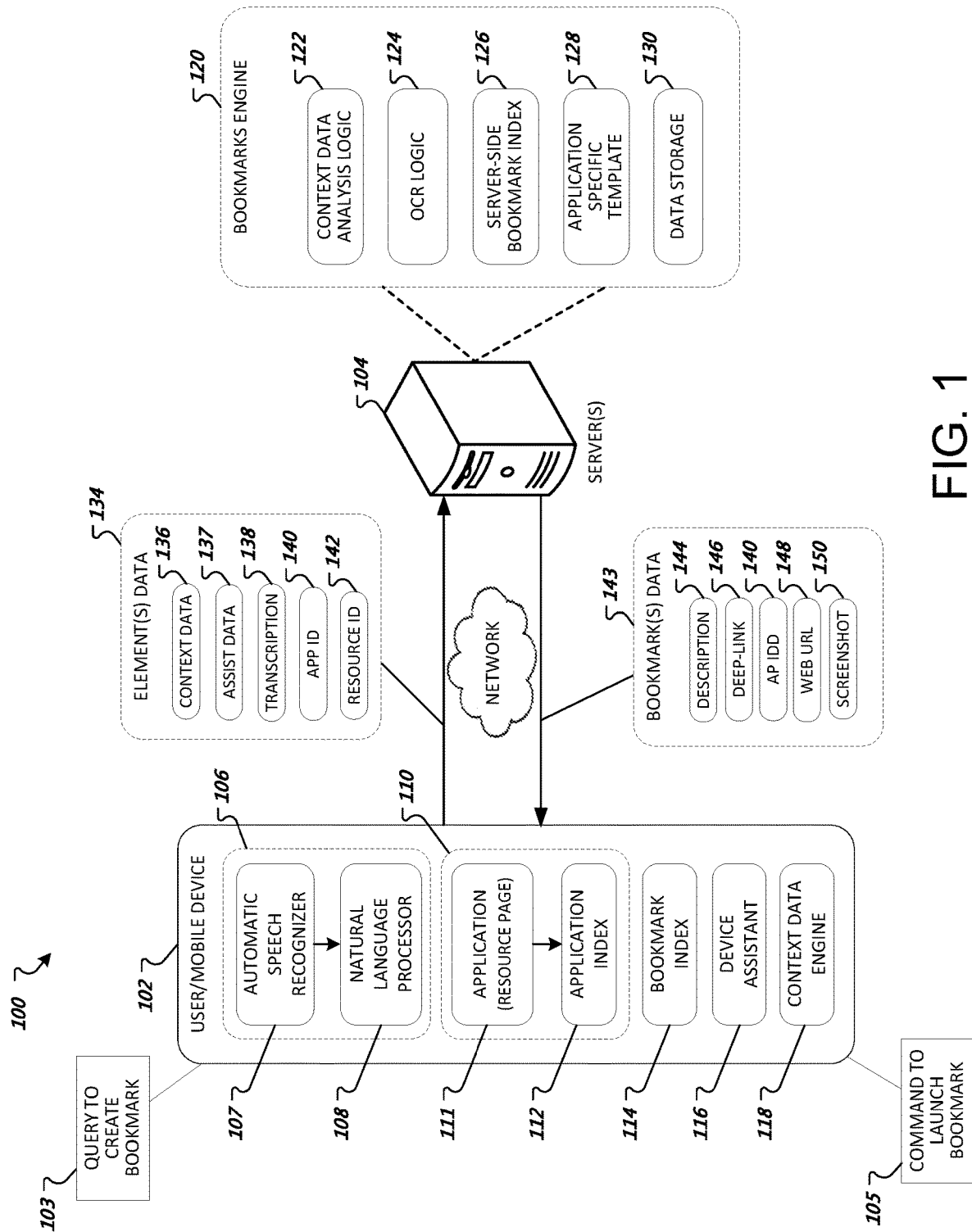
FIG. 1 is an example computing system for creating and accessing bookmarks based on voice input from a user.

FIG. 1 shows a computing system 100 for generating and storing bookmarks based on a first voice input from a user, and for accessing stored bookmarks based on a second voice input from the user. System 100 enables a mobile device to receive voice input to generate a bookmark for accessing a resource page using a web-based Uniform Resource Locator (URL) or for accessing a resource page generated by a native application (also known as "an app") of a mobile device. The mobile device may access the resource page of the native application by accessing an application index that includes multiple deep-links and using a deep-link that maps to the resource page.

A mobile device receives voice input from a user that indicates a desired bookmark function. The mobile device may receive the voice input while the user is browsing a website or web-based resource, or while the user is navigating a resource page of a native application. For example, the mobile device can receive, from the user, a voice query to at least: i) generate/create and store a new bookmark that includes a URL or deep-link for the resource page, ii) delete data for an existing stored bookmark, or iii) access a stored bookmark to view a resource page using a URL or deep-link stored in the bookmark.

To generate the bookmark, a computing server of system 100 receives at least data about a voice input that indicates a desired bookmark function or one or more data elements that indicate contextual information about a particular resource page, the web-based resource, or the native application. For example, the contextual information can include a resource identifier, e.g., a URL/deep-link, associated with the resource page, a screenshot/digital image of the resource page, or an identifier for the native application.

A bookmarks engine of the computing server generates a bookmark based on data about the voice input that indicates the desired bookmark function and/or based on the one or more data elements that indicates the contextual information. The one or more data elements may be stored in association with a corresponding newly generated bookmark. Stored bookmarks can be accessed by the mobile device in response to voice input from a user that indicates a user intent to access a stored bookmark and to view a particular resource page associated with the bookmark.

As used in this specification. a native application is an executable application program, typically referred to as "an app," that can be developed for use by a computing system of mobile device 102 but may not be native, or inherent, to a default operating system of the mobile device. An application program can be developed for use on a particular platform or electronic device, and by virtue of being platform specific, can interact with operating system features or other software functions that are installed on that platform or device.

Referring again to the implementation of FIG. 1, system 100 generally includes user/mobile device 102 and computing server 104 (described below). Mobile device 102 can be any suitable electronic user device configured to receive voice inputs, or other inputs, from a user. In some implementations, mobile device 102 may be a cellular smart phone device, a laptop computer, a desktop computer, a tablet computer, an electronic reader device, a smart television, or any other mobile computing device configured to receive voice input.

Mobile device 102 includes speech module 106. Speech module 106 includes an automatic speech recognizer 107 ("ASR 107") and a natural language processor 108 ("NLP 108"). In some implementations, mobile device 102 receives voice input 103 indicating that a user wants to generate a new bookmark. The bookmark can be used to expedite or streamline subsequent access to a particular web-resource that may be presented to the user on an example display of mobile device 102. Speech module 106 can be used to analyze data about the received voice input, e.g., audio signal data, and to generate a transcription of the voice input.

ASR 107 can be example speech recognition logic, programmed instructions, or algorithms that are executed by one or more processors of mobile device 102 (or computing server 104 described below). For example, ASR 107 can execute program code to manage identification, extraction, and analysis of audio characteristics of received voice input 103. Further, ASR 107 can execute comparator logic to compare audio characteristics of the received voice input 103 to various model parameters stored in connection with NLP 108. Results of the comparison can yield text transcription outputs that correspond substantially to voice/speech utterances of voice input 103.

NLP 108 can be an example language processor used in speech recognition to specify or identify certain word combinations or sequences. In some implementations, NLP 108 can be configured to generate a word sequence probability factor which can be used to indicate the likely occurrence or existence of particular word sequences or word combinations. In some instances, the identified word sequences can correspond primarily to sequences that are specific to speech corpus rather than to, e.g., written corpus.

Mobile device 102 also includes application module 110. Application module 110 can be used at least to: i) execute a particular application 111 for generating a resource page of the application; or ii) access an application index 112 that stores data associated with a particular application 111. In some implementations, application 111 can be at least a web-browser or a native application stored on mobile device 102 and application index 112 can include address data about resource pages of a native application.

In some instances, data stored via application index 112 can include a deep-link to a particular resource page that is generated by application 111. Native applications can be configured to store one or more deep-links in application index 112. and each deep-link can map to a resource page that is generated by the native application. Each deep-link also provides a resource address for accessing a resource page that is mapped to the deep-link.

Mobile device 102 further includes a bookmark index 114, device assistant 116, and context data engine 118. Index 114 provides local storage of, and access to, generated bookmarks. For example, index 114 can be configured to store a listing of multiple bookmarks that are generated at least based on voice input 103.

Device assistant 116 can correspond to a software program configured to provide one or more virtual assistant functions to the user. For example, device assistant 116 can be configured to detect or receive a voice query from a user, execute computations to obtain web results that are responsive to the query, and provide an auditory response based on the obtained web results. As discussed in more detail below, in some implementations, bookmarks can be created using web results generated by device assistant 116 and that are responsive to a user voice query received by mobile device 102.

Context data engine 118 is configured to obtain context data about a web-based resource or native application, e.g., application 111, that is being executed by mobile device 102 when voice input 103 is received by the device. For example, data engine 118 can be configured to extract one or more of: i) a URL that uniquely identifies a resource page of a native application, ii) an identifier for the native application, iii) a website URL that uniquely identifies a resource page of the website, or iv) a screenshot of a resource page presented to the user on a display of mobile device 102 when voice input 103 is received by the device.

In some implementations, device assistant 116 can generate data associated with a displayed resource page, e.g., device assist data 137. This device assist data 137 can include multiple data elements that indicate attributes of the displayed resource page. For example, device assist data 137 can include a username of a sender or recipient of an electronic message displayed by an example messaging application or data about information displayed via a particular resource page.

Assist data 137 as well as screenshot data can be annotated using multiple annotators. For example, information such as entities, names, contacts, user names, addresses, or phone numbers can be annotated such that data for creating a bookmark can be extracted based on the annotation.

Elements data 134 can include context data 136, device assist data 137, a transcription 138, an application identifier 140 ("app ID 140"), and a resource identifier (ID) 142. Context data 136 can indicate contextual information about a particular resource page generated for display to the user or information about a web-based resource or a native application that is accessible via mobile device 102.

For example, contextual information of context data 136 can include at least one of: i) resource identifier 142, e.g., a URL/deep-link, that provides an address for accessing a particular resource page; ii) description data that can be used to identify a new bookmark; iii) a screenshot/digital image of a particular resource page; or iv) an app ID 140 that identifies a native application that is executed by mobile device 102 and for which a user desires to create a bookmark.

Elements 134 can generally include data about query voice inputs received by mobile device 102. Such data can include transcription 138 that indicates one or more desired bookmark functions received by mobile device 102. As shown in FIG. 1, mobile device 102 can receive voice input 103, 105 from a user and which indicates a desired bookmark function. For example, the mobile device can receive, from the user, a voice query to at least: i) generate/create and store a new bookmark that includes a URL or deep-link for a particular resource page, or ii) access a stored bookmark to view a particular resource page using a URL or deep-link stored in the bookmark.

Mobile device 102 can receive the voice input while the user is browsing a website or web-based resource, or while the user is navigating a resource page of a native application. In response to system 100 receiving a query to create/generate a bookmark, computing server 104 receives or obtains elements 134 from mobile device 102. Server 104 uses the received elements 134 to generate and store one or more bookmarks.

Computing server 104 generally includes a bookmarks engine 120 ("BM engine 120") that receives elements 134 and generates one or more bookmarks based on elements 134. BM engine 120 includes data analysis logic 122, Optical Character Recognition (OCR) logic 124, a bookmark index 126, an application template 128, and data storage 130. BM engine 120 can be an example computing module of server 104 (or accessible by server 104) and that is configured to receive and process multiple data elements for generating multiple bookmarks for storage in bookmark index 126 and data storage 130.

As used in this specification, the term "module" is intended to include, but is not limited to, one or more computers configured to execute one or more software programs that include program code that causes a processing device(s) of the computer to execute one or more functions. The term "computer" is intended to include any data processing device, such as a desktop computer, a laptop computer, a mainframe computer, a tablet device, a server, a handheld device, a mobile or smartphone device or any other device able to process data.

In some implementations, BM engine 120 can be configured to use data analysis logic 122 to analyze elements data 134 received from mobile device 102. OCR logic 124 can be used by BM engine 120 to recognize optical characters of an example transcription received from mobile device 102, and that corresponds to a voice query received by mobile device 102.

Logic 122 can be used to extract certain data from elements data 134 and use the extracted data to generate/create a bookmark. For example, a bookmark can be created by BM engine 120 using logic 122 to extract or obtain a resource identifier corresponding to one of: i) a native application deep-link, ii) website URL, iii) or a screenshot of a resource page.

In some implementations, obtaining a resource identifier can include system 100 accessing application index 112, which stores one or more deep-links associated with a native application, and selecting a deep-link from the application index that indicates a link, e.g., a URL, for a resource page. The selected deep-link can correspond to resource ID 142 and can be provided to BM engine 120 with elements data 134. BM engine 120 can use the selected deep-link as the obtained resource identifier for generating the bookmark, whereby the deep-link provides a resource address for accessing the resource page.

In some implementations, context data 136 can be joined with other pre-existing data to generate a bookmark. Example pre-existing data can include at least one native application for which a structure of one or more deep-links of the native application is known to mobile device 102. In some instances, this example pre-existing data can be used by server 104 to obtain at least one deep-link for generating a bookmark.

BM engine 120 can be configured to generate an application template 128 that includes data for at least a subset of data items that form context data 136. In some implementations, BM engine 120 can use the generated template 128 to obtain at least one of: a URL corresponding to a resource identifier for a web-based resource, or a deep-link corresponding to a resource identifier for a native application. Book engine 120 can then use template 128, and either the URL or the deep-link, to generate a bookmark for accessing a particular resource page.

Generated bookmarks may be stored in bookmarks index 126. Mobile device 102 can be configured access index 126 in response to a voice input 105 received by mobile device 102. In some implementations, BM engine 120 stores bookmarks in bookmarks index 126 (server-side) and transmits bookmarks data 143 (described below) to mobile device 102 for local storage on the device at bookmarks index 114.

For example, in response to receiving a user command to access a particular bookmark, mobile device 102 can send a request to server 104 to obtain/access the particular bookmark from its stored location in bookmarks index 126 (server-side). Alternatively, in response to receiving a user command to access a particular bookmark, rather than send a request to server 104, mobile device 102 can obtain/access the particular bookmark from its stored location in bookmarks index 114 (local to device 102).

In some implementations, voice input 105 is a user command received by mobile device 102 that causes the device to access a bookmark stored in one of bookmark index 114 or index 126. In some instances, generated bookmarks, and at least a subset of elements that form elements data 134, can each be stored in data storage 130 to facilitate or streamline access to stored bookmarks. Mobile device 102 receives or accesses/obtains bookmarks data 143 in response to receiving voice input 105.

For example, receipt of voice input 105 by mobile device 102 can cause the device to send a request to server 104 to access a particular bookmark stored in bookmark index 126. In response to receiving the request, server 102 can transmit bookmarks data 143. Bookmarks data 143 ("BM data 143") can include description 144, deep-link 146, web URL 148, screenshot data 150, and app ID 140 discussed above. Mobile device 102 can use a resource identifier of BM data 143 to access a particular resource page and present the resource page to a user via a display of mobile device 102.

Regarding BM data 143, description 144 includes bookmark description data used to identify a newly created bookmark. An example description 144 can be text such as "my internet bank," or "G. Doe's Restaurant." Deep-link 146 is a resource identifier used by mobile device 102 to access a resource page of a native application. Web URL 148 is a resource identifier used by mobile device 102 to access a resource page of a web-browser application. Screenshot 150 is a digital image of a resource page that can be presented to the user when mobile device 102 accesses a stored bookmark.

Figure 2:
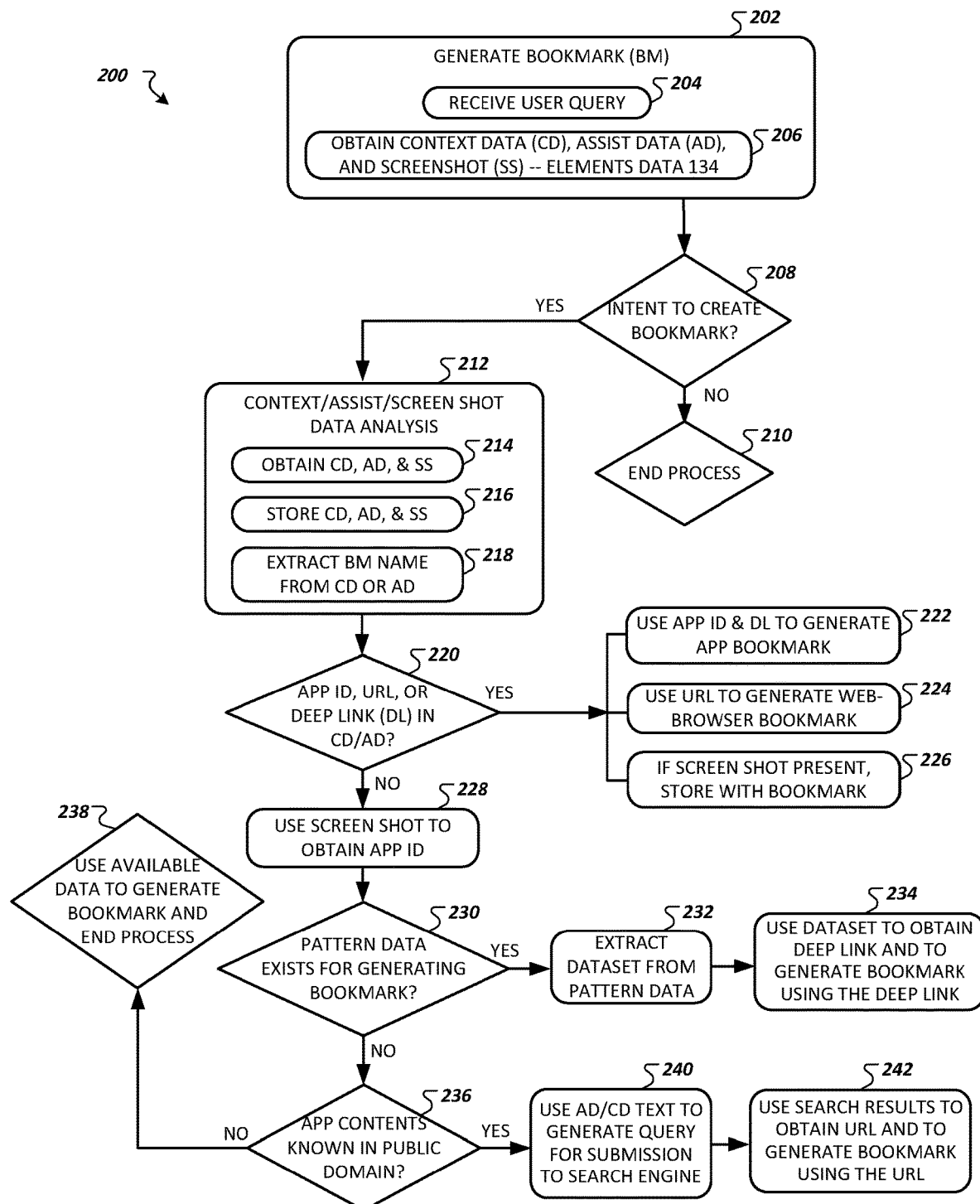
FIG. 2 is a flow diagram of an example process for creating bookmarks based on voice input from a user.

FIG. 2 is a flow diagram of an example process 200 for creating bookmarks based on voice input from a user. Described operations or steps of process 200 can be enabled or performed based on execution of computing logic or programmed instructions that are executable by processors and memory of example mobile/user devices and example computing servers of system 100.

Box 202 indicates operations of process 200 that pertain to generating a bookmark. At box 204, mobile device 102 receives a user voice query, e.g., voice input 103, that indicates a user desire to generate a bookmark for accessing a particular resource page. In some implementations, indicating a desire to create a bookmark includes a user explicitly stating that they want to create a bookmark for a resource page. At box 206, responsive to receiving the user query, system 100 can prepare, extract or obtain elements 134 for transmission to computing server 104.

The resource page for which the user wants to a create a bookmark can be presently viewable by a user via a display of mobile device 102. In some instances, a resource page for which a user wants to a create a bookmark can a web result that is suggested to the user by device assistant 116. The user voice query stating a user wants to create a bookmark can include a name the user wants assigned to the created bookmark.

In some implementations, system 100 can analyze the voice query to determine if the intent of the user query is for system 100 to create a bookmark. For example, system 100 can use one or more techniques such as grammar analysis or n-gram analysis to detect certain words or phrases that indicate an intent to create a bookmark. Further, system 100 can use machine-learning logic to determine or detect an embedded query that indicates an intent to create a bookmark.

At box 208, process 200 includes determining whether the user intends for system 100 to create a bookmark. If system 100 determines that a user does not intend for the system to create a bookmark, then process 200 ends at box 210. If system 100 determines that a user does intend for the system to create a bookmark, then process 200 proceeds to box 212 and system 100 transmits elements 134 to computing server 104.

At box 212, system 100 can use BM engine 120 to analyze data items of elements data 134 and store one or more items of elements data 134 in storage 130. For example, at box 214, BM engine 120 obtains or receives at least a portion of elements data 134 from server 104 and, at box 216, BM engine 120 may store at least a portion of elements data 134 in data storage 130. At box 218, BM engine 120 can use logic 122 to analyze elements data 134 and extract at least a name to be assigned to the bookmark that is used to identify the bookmark. As described above, a portion or subset of elements data 134 can include one or more of context data 136, assist data 137, transcription 138, app ID 140, or resource ID 142.

Query voice input 103 stating user intent to create a bookmark can also include a name the user wants assigned to identify the created bookmark. For example, voice input 103 can include a user statement "bookmark page as my banking," thus, "my banking" will be the name used to identify the bookmark. Mobile device 102 can receive multiple voice input 103 queries during a single user session. In some implementations, for a current user session in which the user has previously created as least one bookmark, BM engine 120 can use the content data of the most recent prior query to obtain or extract a name for identifying the bookmark.

In some implementations, responsive to receiving voice input 103 (box 204), system 100 uses BM engine 120 to create or obtain a resource identifier associated with a resource page for which the user wants to a create a bookmark. For a resource page generated by a native application, BM engine 120 can obtain a resource identifier using an application deep-link that provides a resource address for accessing the resource page. Alternatively, or additionally, for a resource page generated by a web-browser application, BM engine 120 can create a resource identifier using a URL that provides a resource address for accessing the resource page.

In some implementations, when system 100 generates a bookmark, BM engine 120 creates or obtains a resource identifier for a resource page that a user is currently viewing via a display of mobile device 102. In some instances, obtaining a resource identifier for a resource page generated by a native application can also include obtaining an application identifier (app ID) of the native application and associating the app ID with the resource identifier. As indicated above, resource identifiers for generating bookmarks can be obtained from elements data 134, or can be at least partially created by system 100 based on one or more process steps described below.

For example, at box 220, process 200 determines whether a resource identifier corresponding to a URL or a deep-link can be obtained from elements data 134, e.g., by using context data 136 or assist data 137. Likewise, at box 220, process 200 determines whether an app ID for a native application can be obtained from elements data 134, e.g., by using app ID) 140.

If system 100 determines that a resource identifier for a URL or a deep-link, or an app ID for a native application, can be obtained from elements data 134, then system 100 can at least one of: i) use the obtained deep-link as a resource identifier, including the app ID, to generate and store a bookmark for accessing a resource page of a native application (box 222); ii) use the obtained URL as a resource identifier to generate and store a bookmark for accessing a resource page of a web-browser (box 224); or iii) store any screenshot data that is extractable from context data 136 (box 226). In some instances, screenshot data can be stored in data storage 130 and linked with the generated bookmark.

If system 100 determines that a resource identifier for a URL or a deep-link, or an app ID for a native application, cannot be obtained from elements data 134, then system 100 can use screenshot data (box 228) included with context data 136 to obtain an app ID. Alternatively, system 100 can also use assist data 137 to obtain an app ID.

In some implementations, application index 112 may not include deep-links for resource pages generated by a native application and index 112 also may not include an app ID for a particular native application. Hence, in some instances, mobile device 102 may provide a resource page, for display to a user, that is generated by a native application, other than a web-browser, that does not store application deep-links to a native application index, e.g., index 112.

At box 230, and for implementations in which index 112 does not include a particular deep-link or app ID, system 100 can detect or determine whether pattern data exists that can be used to generate a bookmark. The pattern data can correspond to a native application for which a known pattern of creating application deep-links exists within system 100, and/or is stored in a memory of system 100. Pattern data may exist for a variety of different types of native applications that are installed on, or accessible from, a user device. Thus, pattern data can be used for any type of application that routinely creates application deep-links.

In some implementations, pattern data can be associated with one or more items of elements data 134, such as assist data 137 or screenshot images of context data 136. For example, assist data 137 and/or screenshot data can correspond to a messaging application, e.g., a native application, installed on mobile device 102. Pattern data can include an attribute of a user identified in two or more messages, such as a username or contact name displayed in a chat app, or a phone number stored in a user contact's list that is accessible by the chat app.

In other implementations, pattern data associated with items of elements data 134 can correspond to the variety of other types of native applications that are accessible using mobile device 102. For example, pattern data can exist for, or correspond to, gaming applications, restaurant review applications, banking applications, social media applications, or any other type of application that routinely creates pattern data that can include an application deep-link.

For example, if a user is playing "Angry Games," a popular gaming application, at level 7 of Angry Games, the text "level 7" can be generated for display to the user via mobile device 102. In particular, at least one deep-link associated with pattern data for the Angry Games app may include or contain the level number within a hyperlink or unique identifier that defines the deep-link. For example, a deep-link to a particular indexed level (or section) of Angry Games may have a general pattern "angry-games://$level," and more specifically, a deep-link to level 7 of Angry Games may have the general pattern "angry-games://7." In some instances, the preceding example general pattern can apply to the variety of other types of applications and may be represented as, for example, "any-app://$section/level."

In this context, in response to detecting or determining the existences of this pattern data, system 100 can analyze and/or extract at least the level/section number from items of elements data 134 that include, or that are associated with, the pattern data (e.g., assist data 137 or screenshot images of context data 136). Hence, system 100 can use this pattern data to construct or generate an example bookmark using a deep-link to Angry Games level 7, or to Any App section. With reference to the bookmark for Angry Games, selection of the bookmark can cause execution of the gaming application to view aspects of level 7 that were previously generated for display to the user. In general, pattern data can be analyzed and extracted to form datasets that are used to create an application deep-link and a resource identifier for the deep-link.

In some implementations, a resource page for which the user wants to create a bookmark may be a page that is generated by a messaging application, or one or more other types of applications, installed on mobile device 102 device. In this implementation, a resource identifier for the resource page can be at least one of: i) data identifying a screen image of the resource page generated by the messaging/any application, e.g., a screenshot of a messaging/chat window; or ii) a deep-link that provides a resource address for accessing the resource page of the messaging/any application. Hence, system 100 can be configured to detect pattern data based on analysis of two or more messages/other data associated with a messaging/any application, and to generate a deep-link based on the pattern data.

At box 232, system 100 can use and/or extract one or more data elements of detected pattern data to create an application deep-link. For example, system 100 can reference at least assist data 137, or screenshot data, that at least partially forms the pattern data, to extract the one or more data elements to create an application deep-link. At box 234, extracted data elements of the pattern data can form datasets used by system 100 to generate a deep-link that serves as a resource identifier for generating a bookmark that is stored in bookmark index 126 and/or index 112.

Referring again to box 230, for implementations in which index 112 does not include a particular deep-link or app ID, if system 100 cannot detect or determine whether pattern data exists for generating a bookmark, then system 100 can determine whether contents of a particular native application are known in the public domain (box 236).

If system 100 determines that contents of a particular native application are known in the public domain, the system 100 can use text data from the assist data 137 and/or context data 136 to generate an example query for submission to a search engine. For example, a bookmark can be generated using a "look up" or search feature of mobile device 102. In some implementations, BM engine 120 uses portions of text extracted from context data 136 to formulate search queries that are received and processed by a search engine to generate one or more search results.

At box 242, system 100 uses the generated one or more search results of these search queries to select or obtain a URL, deep-link, and/or application ID of a document or resource page that is displayed via user device 102. The obtained URL or deep-link, along with an app ID, are stored in bookmark index 126 and/or index 112 and serve as a resource identifier used in generating a bookmark for accessing the document or resource page displayed via user device 102.

In some instances, additional data extracted from context data 136, or assist data 137, and that accompanies either voice input 103, or a search query, may also be stored in association with a created bookmark to facilitate retrieval of the created bookmark.

If system 100 determines that contents of a particular native application are not known in the public domain, then system 100 can use any data available in elements data 134 (e.g., screenshot data) to obtain a URL or deep-link that can serve as a resource identifier for generating a bookmark. As indicated above, the generated bookmark may be stored in bookmark index 126 and/or index 112 and used to access a particular document or resource page displayed via user device 102.

In some implementations, when screenshot data is present in, or included with, context data 136, BM engine 120 can store this screenshot data in association with a bookmark when generating or creating a bookmark. However, in some instances, system 100 may be unable to obtain an application deep-link and a corresponding app ID, or may be unable to obtain a web URL. When this occurs, system 100 can generate a bookmark using the screenshot data and store the screenshot data as a resource identifier of the bookmark. Hence, accessing this particular bookmark that uses a screenshot as a resource identifier will cause mobile device 102 to display image data corresponding to the screenshot.

Referring again to box 242, in some implementations, system 100 uses the search engine to compute or generate a set of search results. For example, system 100 can compute a set of search results as a union of search results obtained for multiple issued queries. System 100 can then generate a score for each search result from the set of search results. In some implementations, a generated score may depend on a number of queries for which a search result was part of a top number search results (e.g., top 5, or top 10 search results).

For a particular number of top search results, system 100 can detect or determine whether a particular search result has a score that exceeds a predefined threshold score. For the particular search result having a score that exceeds the threshold score, system 100 can select a web URL or deep-link, along with any available app ID data, of that search result for use as a resource identifier for generating a bookmark. The generated bookmark can then be stored in bookmark index 126. or index 112.

In some implementations, prior to creating a bookmark, system 100 may use BM engine 120 to determine whether an existing bookmark stored within the system, e.g., in index 126 or 112, has a bookmark name/identifier that matches a bookmark name/identifier that is to be assigned to a new bookmark. If system 100 detects that an existing bookmark stored within the system has a bookmark name/identifier that matches a bookmark name/identifier to be assigned to a new bookmark, then system 100 can either: i) automatically overwrite data for the existing bookmark with data for the new bookmark, or ii) use mobile device 102 to generate a text-based or auditory query to which mobile device 102 can receive reply data. e.g., from a user, that indicates a desired bookmark function.

For example, based on the received reply data, the text-based or auditory query can be used by system 100 to: i) overwrite data for the existing bookmark with data for the new bookmark, ii) cancel creation of the new bookmark, or iii) modify the bookmark name/identifier to be assigned to the new bookmark. Hence, system 100 can determine an identifier for a bookmark based on the first voice input received by device 102. Because the identifier for the bookmark can be a name of the bookmark, system 100 can be configured to modify an identifier for an existing bookmark, where modifying the identifier for the existing bookmark includes renaming the existing bookmark.

Figure 3:
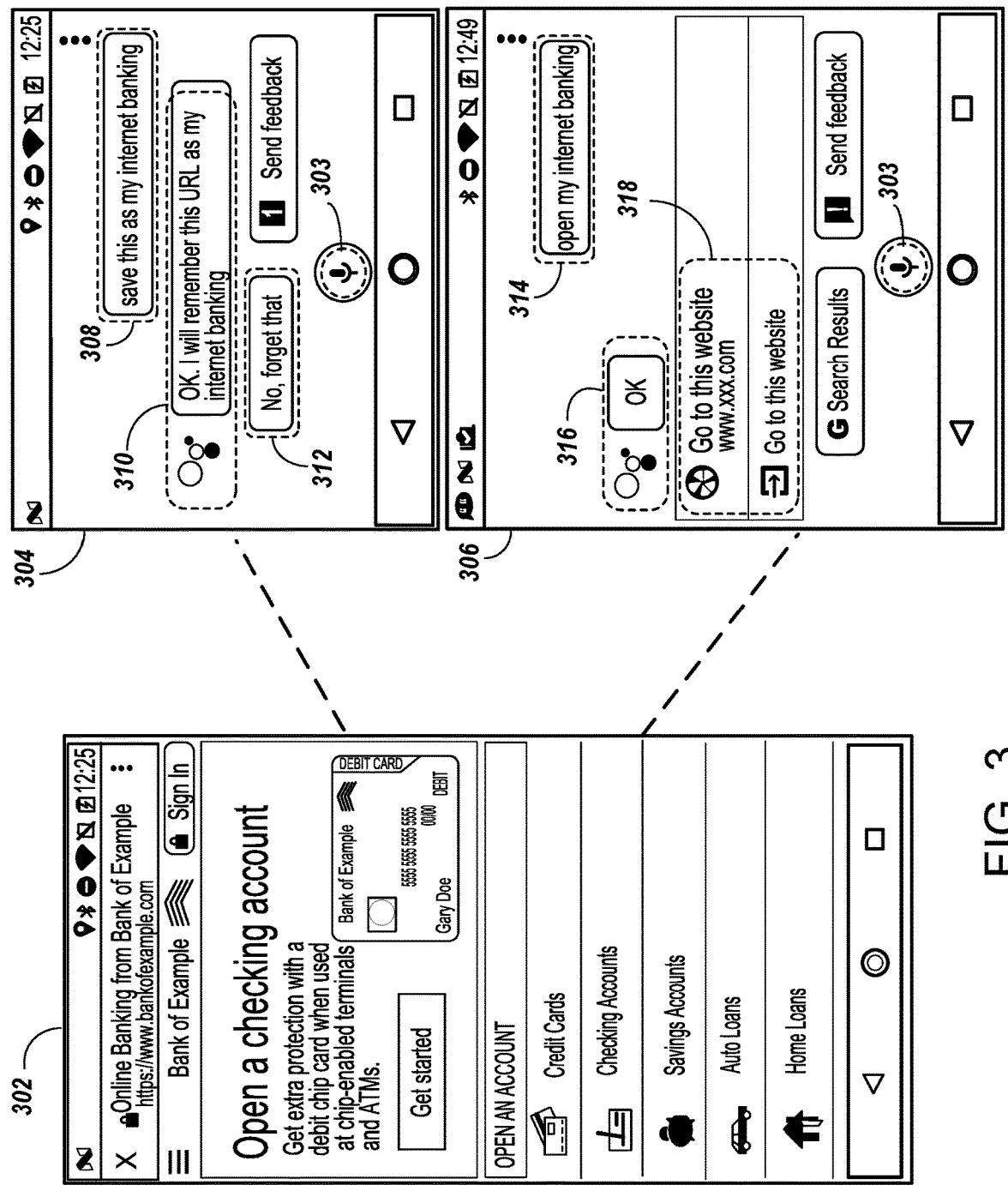
FIG. 3 shows a first set of example user interfaces for creating and accessing bookmarks based on voice input from a user.

FIG. 3 shows a first set of example user interfaces 302, 304, and 306 for creating and accessing one or more bookmarks based on voice input from a user. Interface 302 shows an example banking resource page that can be viewed or accessed using mobile device 102. Interface 302 can correspond to an example website accessed via a web URL ("www.bankofexample.com"). Interface 304 can be an example interface that is associated with device assistant 116. Interface 304 shows input 308, output 310, and suggestion 312. In some implementations, input 308 can be a transcription of voice input 103 received by mobile device 102.

For example, a user may be viewing the Bank of Example Internet banking website and issued voice input 103 to mobile device 102 by speaking one of the following example queries: i) "save this as my internet banking," ii) "bookmark this as my internet banking," or iii) "remember it as my internet banking." A display of mobile device 102 can show a microphone icon 303 that illuminates (e.g., when tapped by a user) to provide indication to the user that a listening mode of mobile device 102 has been activated, such that mobile device 102 is ready to receive voice input. In some implementations, the user can select suggestion 312 to cancel creating the example bookmark for the internet banking website.

In response to receiving the query, mobile device 102 can generate a transcription 138 that corresponds to input 308. As discussed above, mobile device 102 provides, and server 104 receives, at least the web URL and other data that can be included in elements data 134. BM engine 120 generates and stores a bookmark that may be identified as "my internet banking." Upon creating the bookmark, system 100 can cause mobile device 102 to generate output 310 indicating to the user that the web URL/resource identifier has been remembered, e.g., stored in a bookmark index, as the bookmark name "my internet banking."

Interface 306 can be another example interface that is associated with device assistant 116. Interface 306 shows input 314, output 316, and bookmark 318. In some implementations, input 314 can be a transcription of voice input 105 received by mobile device 102. For example, a user may want to use a stored bookmark to view the Bank of Example Internet banking website. The user can activate a listening mode (e.g., using icon 303) of mobile device 102 and issue voice input command 105 to mobile device 102 by speaking one of the following example queries/commands: i) "my internet banking," ii) "open my internet banking," iii)"go to my internet banking," or iv) "navigate to my internet banking."

In response to receiving the command, mobile device 102 can generate a transcription 138 that corresponds to input 314. Server 104 can then provide, and mobile device 102 receives, at least the web URL and other data that can be included in bookmarks data 143. BM engine 120 can access, from index 126, a stored bookmark that may be identified as "my internet banking."

After providing bookmarks data 143, system 100 can cause mobile device 102 to: i) generate output 316 indicating the system confirms receipt of the command; and ii) generate output 316 indicating the web URL/resource identifier that was stored in bookmark index 126 as the bookmark name "my internet banking."

As discussed above, in some implementations, rather than receiving a bookmark identified as "my internet banking" from server 104, mobile device 102 can access local bookmark index 112 to obtain a bookmark based on a bookmark name indicated by voice input 105. After obtaining the URL or resource identifier for the bookmark, mobile device 102 can generate output 316 indicating, to the user, the web URL/resource identifier stored in bookmark index 112 as the bookmark indicated by voice input commend 105.

The following description illustrates an example operation or process of system 100 where a bookmark is created to store a resource page for an electronic conversation that occurs via a native application such as a chat or messaging application. A user may be viewing chat messages exchanged between the user and Dad via a chat application installed on mobile device 102. The user can provide, and mobile device 102 receives, voice input 103 when the user says "save this as my chats with dad."

In response to receiving this voice input 103, device 102 sends assist data 137 to server 104 and the data can correspond to the screen or interface of the chat application that the user is viewing. In some instances, device 102 may not send elements data 134 that correspond to the native chat application or a web URL. Assist data 137 received by server 104 can include a username corresponding to "Dad" that is located at a particular position in the screenshot image, e.g., at a top bar of the image.

When server 104 receives assist data 137, the following result may occur. The username, e.g., "Dad," as well as an app ID are extracted from assist data 137 and a deep-link to the native chat application is constructed. In some instances, deep-links to chat applications can have a known data pattern having a username that can be extracted. The constructed deep-link and an app ID are stored in at least one of bookmark index 126 or index 112.

Thus, the next time device 102 receives voice input from the user, e.g., voice command 105, device 102 will display to the user a chat interface/resource page of the native chat application that shows the user's electronic conversation with Dad. Example voice input for commands 105 can include the user saying one of the following: i) "my chats with dad;" ii) "show me my chats with dad;" or iii) "go to my chats with dad."

In an alternative implementation, assist data 137 can include a full or partial name of a contact, e.g., "Dad," or "Michael," and may also include a surname of the contact. Hence, in addition to the example operation/process described above, when server 104 receives assist data 137, a full or partial name of the contact can be extracted from assist data 137. The name of the contact can be stored with the user's contacts in an example contacts list and a phone number corresponding to "Michael" is extracted.

A deep-link to the native chat application is constructed and the deep-link can include the phone number for Michael. In some instances, deep-links to chat applications can have a known data pattern having a phone number that can be extracted and corresponding to a second user with whom a first user may want to chat with. The constructed deep-link and an app ID are stored in at least one of bookmark index 126 or index 112.

Thus, the next time device 102 receives voice input from the user, e.g., voice command 105, device 102 will display to the user a chat interface/resource page of the native chat application that shows the user's electronic conversation with Michael. Example voice input for commands 105 can include the user saying one of the following: i) "my messages with Michael;" ii) "show me my messages with Michael;" or iii) "go to my messages with Michael."

Figure 4:
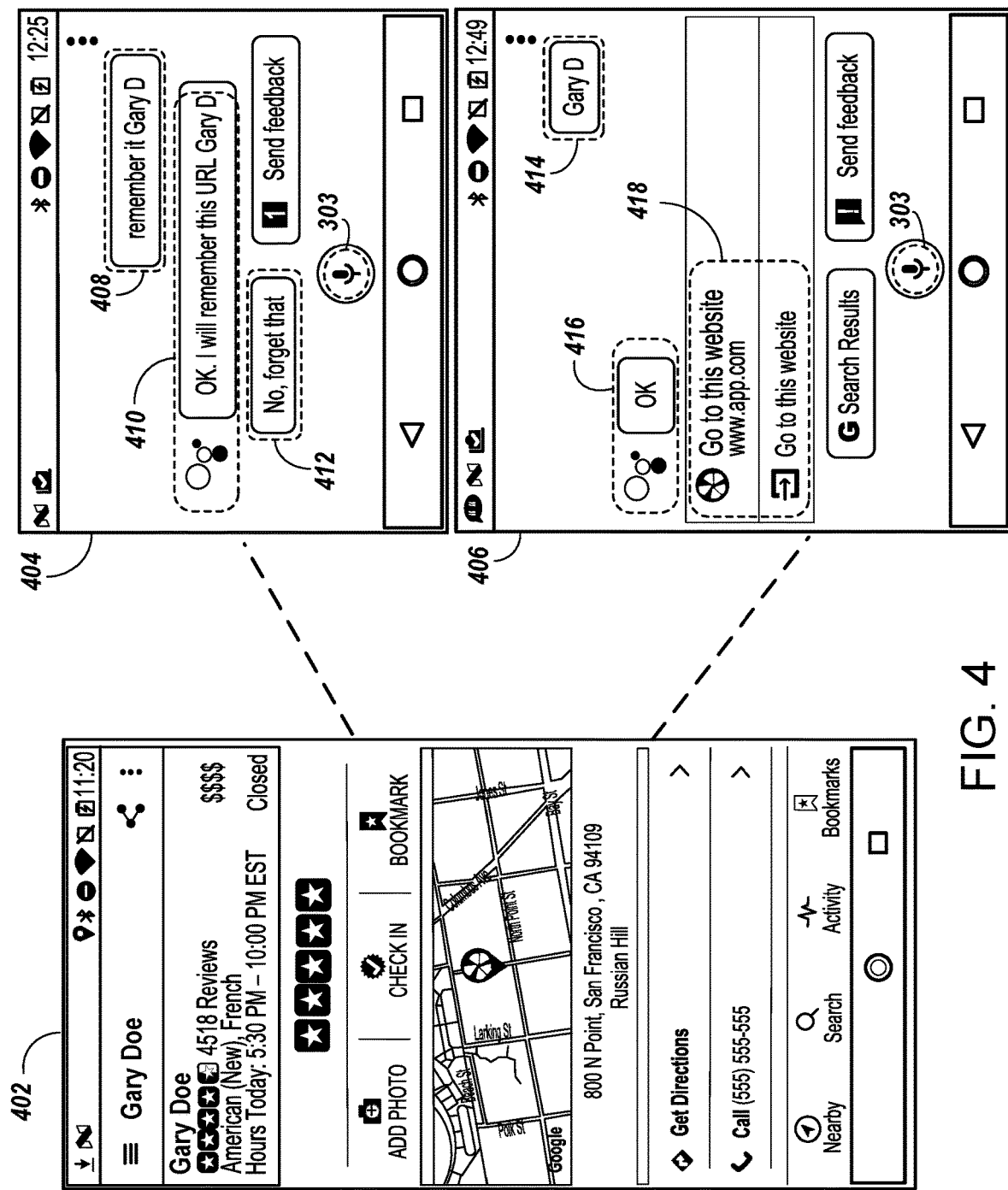
FIG. 4 shows a second set of example user interfaces for creating and accessing bookmarks based on voice input from a user.

FIG. 4 shows a second set of example user interfaces 402, 404, 406 for creating and accessing bookmarks based on voice input from a user. Interface 402 shows an example restaurant review resource page that can be viewed or accessed using mobile device 102. Interface 402 can correspond to an example native application accessed via a deep-link and app ID. Interface 404 can be an example interface that is associated with device assistant 116. Interface 404 shows input 408, output 410, and suggestion 412. In some implementations, input 408 can be a transcription of voice input 103 received by mobile device 102.

For example, a user may be viewing a native application resource page for restaurant reviews and issued voice input 103 to mobile device 102 by speaking an example query such as "remember it Gary D." In some implementations, a user can select suggestion 412 to cancel creating the example bookmark for the native application resource page. In response to receiving the query, mobile device 102 can generate a transcription 138 that corresponds to input 408.

As discussed above, mobile device 102 provides, and server 104 receives, an application deep-link/resource identifier which uniquely identifies a resource page generated by the native application, an app ID) for the native application, and other data that can be included in elements data 134. In some implementations, mobile device 102 may also provide, and server 104 can receive, a web URL which may be the same as a native application URL that is distinct from the deep-link. BM engine 120 generates and stores a bookmark that may be identified as "Gary D."

Upon creating the bookmark, system 100 can cause mobile device 102 to generate output 410 indicating to the user that the URL (deep-link)/resource identifier has been remembered, e.g., stored in a bookmark index, as the bookmark name "Gary D."

Interface 406 can be another example interface that is associated with device assistant 116. Interface 406 shows input 414, output 416, and bookmark 418. In some implementations, input 414 can be a transcription of voice input 105 received by mobile device 102. For example, a user may want to use a stored bookmark to view the native application resource page for restaurant reviews. The user can issue voice input command 105 to mobile device 102 by speaking one of the following example queries/commands: i) "Gary D." ii) "open Gary D," or iii) "show me Gary D."

In response to receiving the command, mobile device 102 can generate a transcription 138 that corresponds to input 414. Server 104 can then provide, and mobile device 102 receives, at least the deep-link 146, app ID 140, and other data that can be included in bookmarks data 143. BM engine 120 can access, from index 126, a stored bookmark that may be identified as "Gary D."

After providing bookmarks data 143, system 100 can cause mobile device 102 to: i) generate output 416 indicating the system confirms receipt of the command; and ii) generate output 416 indicating the URL/deep-link/resource identifier that was stored in bookmark index 126 as the bookmark name "Gary D." In some implementations, accessing the resource identifier of the bookmark causes mobile device 102 to use the native application associated with the deep-link to display the resource page mapped to the deep-link.

In some instances, the particular native application that is associated with the deep-link may no longer be installed on mobile device 102. In this instance, a web URL for the resource page of the native application may have been obtained by system 100 when creating the bookmark "Gary D." Hence, if the native application for displaying a resource page of the bookmark cannot be accessed by mobile device 102, then the resource page, e.g., the "Gary Doe" restaurant review page, may be displayed via a web browser using the web URL obtained when creating the bookmark.

As discussed above, in some implementations, rather than receiving a bookmark identified as "Gary D" from server 104, mobile device 102 can access local bookmark index 112 to obtain a bookmark indicated by voice input commend 105. After obtaining the URL, deep-link, or resource identifier for the bookmark, mobile device 102 can generate output 416 indicating, to the user, the URL/deep-link/resource identifier that was stored in bookmark index 112 as the bookmark indicated by voice input commend 105.

The following description illustrates an example operation or process of system 100 for retrieving a bookmark stored in bookmark index 126, 112. In response to mobile device 102 receiving user voice input 105, a sequence of actions in decreasing order of priority can be executed or performed by system 100. For example, a sequence of actions in decreasing order of priority can include: i) accessing a deep-link of a bookmark to generate a resource page using a native application; ii) accessing a web URL of a bookmark using a web-browser; or iii) displaying screenshot data of a bookmark.

In some implementations, if one action of the sequence of actions executes successfully, then the remaining actions are not executed. In some instances, if system 100 determines that a user accidentally triggered the bookmark, then system 100 may present or display, to the user, a suggestion to delete the bookmark.

The example operation or process for retrieving a stored bookmark can include system 100 determining that the user intent of voice input/query 105 is to access or open a bookmark to view a certain resource page. In some implementations, system 100 can determine if user intent of voice input/query 105 is to access or open a stored bookmark by determining that one or more words of query 105 correspond to a name of a stored bookmark. For example, system 100 can determine if one or more words of query 105 match a predefined grammar structure for accessing or opening stored bookmarks, and then determine user intent to access a bookmark based on this match.

In some implementations, system 100 can use other techniques to determine user intent to access a stored bookmark. For example, system 100 can be configured to train a machine learning system to generate a query intent model. System 100 can then use the generated query intent model to detect a user intent of query 105 and to detect a bookmark name that matches, or substantially matches, one or more words of query 105.

In response to determining that a user intends to access a stored bookmark, system 100 can extract a bookmark name from query 105 and determine whether a stored bookmark includes a bookmark name that matches the extracted bookmark name. In some implementations, system 100 can extract multiple candidate bookmark names from query 105 and may test each candidate bookmark name to detect or determine a candidate bookmark name that indicates a best, or substantial match, with a stored bookmark name. For example, system 100 can extract multiple candidate bookmark names the entire query 105, or parts of query 105.

In response to detecting a stored bookmark having a name that matches a particular candidate bookmark name, system 100 can select the stored bookmark, initialize an empty sequence of actions, and can proceed to populate the empty sequence of actions with one or more prioritized actions. For example, for a selected stored bookmark, system 100 can determine that an application deep-link and app ID were stored in association with the selected bookmark. Based on this determination, system 100 can populate the sequence of actions by adding an action to launch, execute, or open the deep-link using a particular native application.

Additionally, for the selected stored bookmark, system 100 can determine that a web URL was stored in association with the selected bookmark. Based on this determination, system 100 can further populate the sequence of actions by adding an action to launch, execute, or open the web URL using an example web-browser application of mobile device 102.

Further, for the selected stored bookmark, system 100 can determine that a screenshot was stored in association with the selected bookmark. Based on this determination, system 100 can further populate the sequence of actions by adding an action to access, display, or otherwise open the screenshot using an example image viewing application of mobile device 102. In response to populating the empty sequence of actions to include multiple actions, system 100 then outputs the populated sequence of actions for use by one or more components of system 100.

Figure 5:
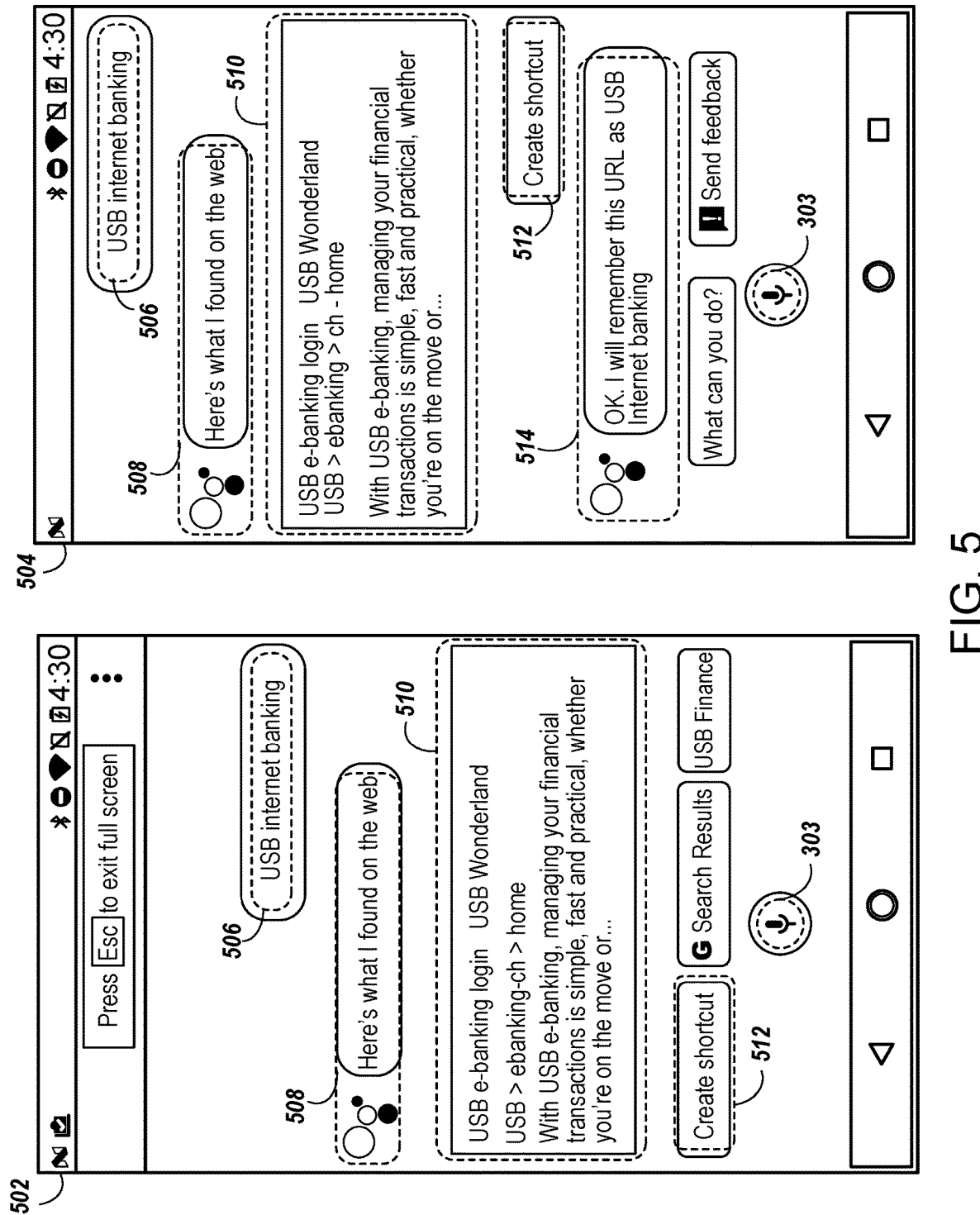
FIG. 5 shows a third set of example user interfaces for creating and accessing bookmarks based on voice input from a user.

FIG. 5 shows a third set of example user interfaces 502 and 504 for creating and accessing bookmarks based on voice input from a user. Interface 502 can be an example interface associated with device assistant 116. Interface 502 shows input 506, output 508, suggestion chip 510, and suggestion chip 512. Input 506 can be a transcription of a query, other than voice input 103, 105, that is received by mobile device 102 from a user that wants to view a resource page, such as a website for USB Bank.

Suggestion chip 510 can be data generated, at least in part, by device assistant 116 that is provided for display to user as a response to the user's query. In some implementations, suggestion chip 510 may be data about a website for USB Internet banking and the data can be suggested based on one or more words of the user's query. For example, a user can issue a query "USB internet banking" to device assistant 116 that is received via mobile device 102. Device assistant 116 provides a card, corresponding to suggestion chip 510, for display to the user which the user can tap, select, or otherwise use to access a USB internet banking resource page, e.g., a website.

In some implementations, in addition to suggestion chip 510, device assistant 116 can generate or otherwise provide suggestion chip 512, or one or more additional suggestion chips, for display to a user as a response to a user query received by mobile device 102. For example, additional suggestion chips can include "Create shortcut" or "Bookmark it" that a user can access or select to create a new bookmark. Hence, selection of suggestion chip 512 will cause system 100 to generate and store an example bookmark by executing one or more of the processes described above.

Interface 504 also shows input 506, output 508, suggestion chip 510, and suggestion chip 512. Interface 504 further shows a user having selected suggestion chip 512 and an output 514 that is generated by system 100 and displayed via an example interface of device assistant 116. Output 514 may be generated by system 100 in response to a user having selected suggestion chip 512. System 100 can generate output 514 to inform the user that system 100 will remember, e.g., store a bookmark named "USB internet banking," a URL or resource identifier that corresponds to data of output 510.

The following example operation further illustrates the process steps of interface 504. A user issues the query "USB internet banking" to a digital assistant on a mobile device. The digital assistant displays or outputs to the user a card, e.g., output 510, corresponding to a suggestion chip which the user can select to access and view USB Bank's Internet Banking page. The digital assistant may display or output additional suggestion chips, e.g., suggestion chip 512. One of the suggestion chips can be "Create shortcut" or "Bookmark it."

When the user presses on or selects a suggestion chip 512 to create a shortcut or bookmark. the following result may occur. The web URL corresponding to USB Bank's Internet banking website, the intent to create a bookmark, and the previous query issued by the user ("USB internet banking") are transmitted to server 104 and a bookmark pointing to the web URL, with the name "USB internet banking" is created. Thus, the next time mobile device 102 receives a user voice query "USB internet banking" (or a similar query), mobile device 102 will display USB Bank's Internet banking website to the user.

The following description illustrates an example operation or process of system 100 for generating, creating, or otherwise adding a "Create shortcut" or "Bookmark it" suggestion chip for display to a user. In some implementations, mobile device 102 receives, from a user, a voice input/query, other than voice input 103, 105, and device assistant 116 can provide a reply result based on the received query.

In response to device 102 receiving the query, system 100 can determine that a reply result provided by device assistant 116 is a web result. Based on this determination, system 100 can provide a "Create shortcut" or "Bookmark it" suggestion chip ("bookmark chip") for display to a user. In some instances, in addition to a bookmark chip, system 100 can include multiple other suggestion chips for presentation to a user based on reply results generated by device assistant 116.

In some implementations, rather than a single result, device assistant 116 may provide multiple reply results that are responsive to a user query received by device 102. System 100 can be configured to analyze the multiple reply results to determine how best to rank potential suggestions chips that can be provided by system 100 for display to a user.

For example, using one or more of the multiple reply results, system 100 may rank the bookmark chip in relation to other potential suggestion chips based on a matching score. The matching score can indicate a match between content of the received query and content of a web result provided by device assistant 116 in response to the received query. The matching score can be computed based on one or more conditions.

Regarding a first condition, in some implementations, when at least one of the multiple web results includes a web URL, system 100 determines an extent to which parts of the received query match, or loosely match, parts of the web URL provided by device assistant 116. System 100 generates a matching score that indicates an extent or magnitude of the match between parts of the received query and parts of the web URL.

For example, system 100 can use or execute program code for data matching and data comparison processes such as entity matching, n-gram similarity, phrase matching, and feature similarity, to indicate a threshold level of consistency between parts of the received query and parts of the web URL. System 100 then generates a matching score based on an outcome of the data matching process and determines if the matching score exceeds a threshold matching score.

As indicated above, system 100 ranks the bookmark chip in relation to other potential suggestion chips based on the matching score. Thus, when a generated matching score (e.g., 0.85) exceeds a threshold matching score (e.g., 0.8), system 100 can rank the bookmark chip highest among other potential suggestion chips and provides the bookmark chip for display to a user based on this ranking.

In some implementations, the bookmark chip may be the only suggestion chip that is provided for display to a user based on a particular ranking and/or matching score. In other implementations, the bookmark chip may be the first suggestion chip of multiple suggestions chips that are provided for display to a user based on a particular ranking and/or matching score.

In some implementations, parts of a received query that match a domain of a web URL of a web result can be indicative of a more significant match for determining that the bookmark chip should be provided for display to a user. Hence, system 100 can generate a higher matching score for received query parts that match a domain of a web URL. For example, if the query includes "Mike's restaurant" and a web URL includes the domain "mikesrestaurant.com," this particular match may generate a higher matching score relative to another received query that includes parts that does not match a domain of a web URL.

Regarding a second condition, in some implementations, relevant parts of a received query that match a web URL of a web result can be indicative of a more significant match for determining that the bookmark chip should be provided for display to a user. A relevant part of a received query can be either an entity of a specific type, e.g., business, website, or a part of a received query which does not intersect any annotated entity.

For example, if the received query includes "website for Mike's restaurant" and a web URL includes the business and website type "mikesrestaurant.com," this particular match may generate a higher matching score relative to another received query that includes parts that does not match a domain of a web URL.

Regarding other conditions, in some implementations, parts of a received query and a web result each include common or matching entities, e.g., business entity "Mike's restaurant," and system 100 determines an importance factor that indicates the importance of the entity. System 100 can generate a matching score based on the importance factor. Stated another way, system 100 can determine the importance of entities that a web result and a received query have in common, and can generate a matching score based on the determined importance. In some instances, a generated matching score can be proportional to a determined importance of the entity.

Other conditions can include system 100 generating a matching score based on the importance of entities that a web result and a received query do not have in common. In some implementations, multiple other signals which may suggest relevance, or lack of relevance. between a received query and a web result can be used by system 100 to generate a matching score.

Figure 6:
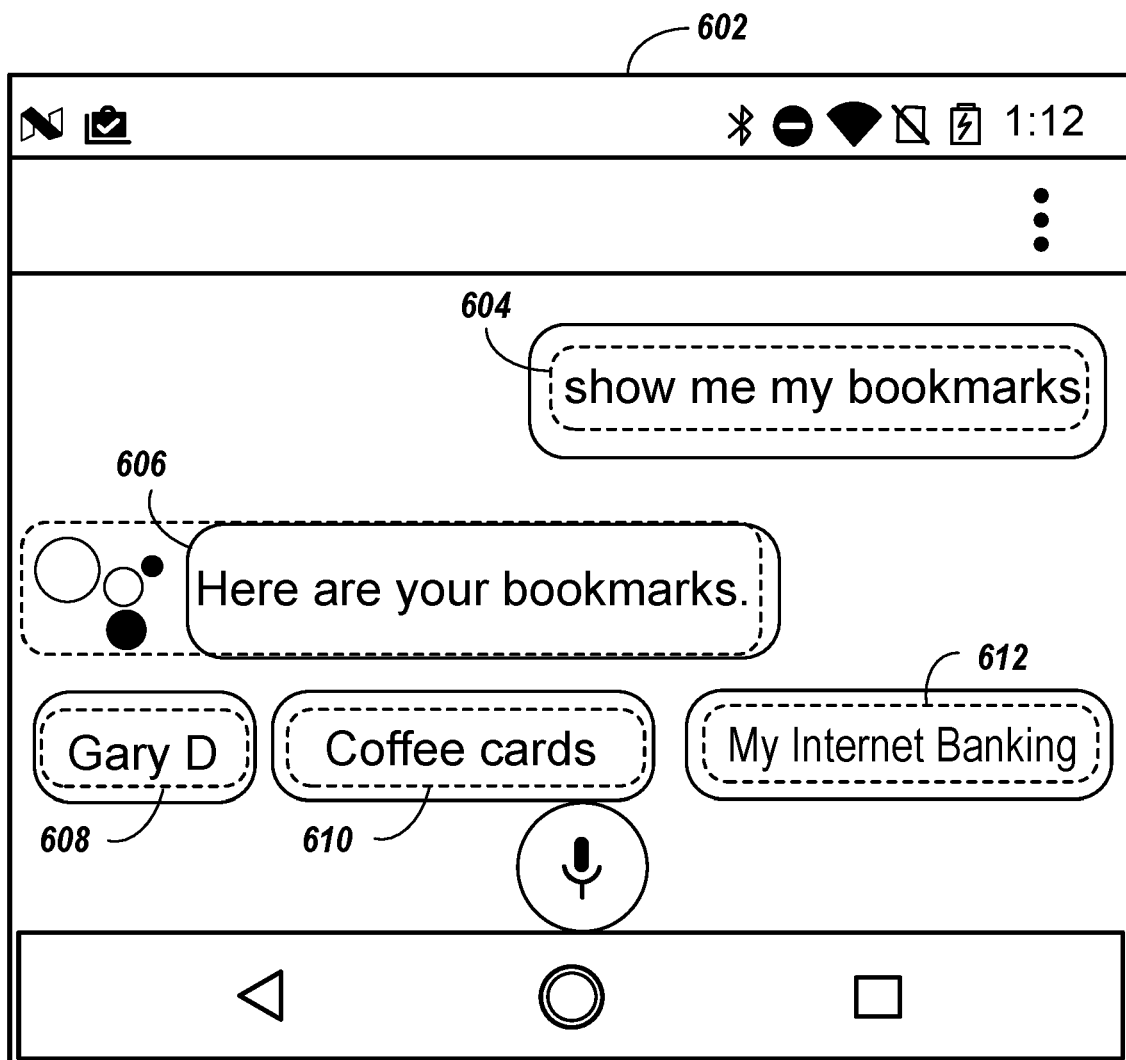
FIG. 6 shows an example user interface for accessing one or more bookmarks based on voice input from a user.

FIG. 6 shows an example user interface 602 for accessing one or more bookmarks based on voice input from a user. In some implementations, system 100 provides a listing of saved bookmarks for display to a user via mobile device 102. The listing of saved bookmarks can be provided for display to the user in response to mobile device 102 receiving voice input from the user and that is transcribed as a user input 604. System 100 generates an output 606 to identify a listing of bookmarks that can include bookmarks 608, 610, and 612.

In some implementations, system 100 determines if a user intent of input 604 is to receive or view a listing of previously created bookmarks. If system 100 determines that the user intent is to receive a listing of previously created bookmarks, then system 100 can be configured to extract any potential selection criteria or filtering criteria that may be identified from query/input 604. System 100 can then select one or more bookmarks which match extracted selection or filtering criteria. In some instances, if no criteria were specified by input 604, or if no criteria can be extracted from input 604, then system 100 may select all previously created bookmarks to be provided for display to the user.

In some implementations, selection or filtering criteria may refer to any additional data that may have been stored in association with a previously created bookmark, as well as to a name of a bookmark. For example, if a user has stored two bookmarks. e.g., "my favorite restaurant in New York" and "my favorite restaurant in San Francisco," then both of these bookmarks would be provided for display in response to a user query/input 604 such as "show me my restaurant bookmarks." In this example, the selection or filtering criteria identified from query/input 604 is voice input corresponding to the word "restaurant."

A listing of bookmarks 608, 610, and 612 can be presented for display to a user in a format that enables a user to immediately tap, click, or otherwise select at least one bookmark. For example, bookmarks 608, 610, and 612 can be each presented for display including a particular hyperlink. Such a hyperlink format can enable selection a bookmark to result in mobile device 102 using an associated application deep-link or web URL of the hyperlink to generate a particular resource page. Additionally, a format of presentation of a bookmarks listing can also allow a user to delete some or all of bookmarks 608, 610, or 612.

In some implementations, system 100 determines if a user intent of input 604 is to delete a particular stored bookmark. If system 100 determines that the user intent is to delete a particular stored bookmark, then system 100 will delete the particular stored bookmark when a name X of the particular bookmark or a variation of the name X, e.g., input Y, similar to name X, is a part of query/input 604.

Figure 7:
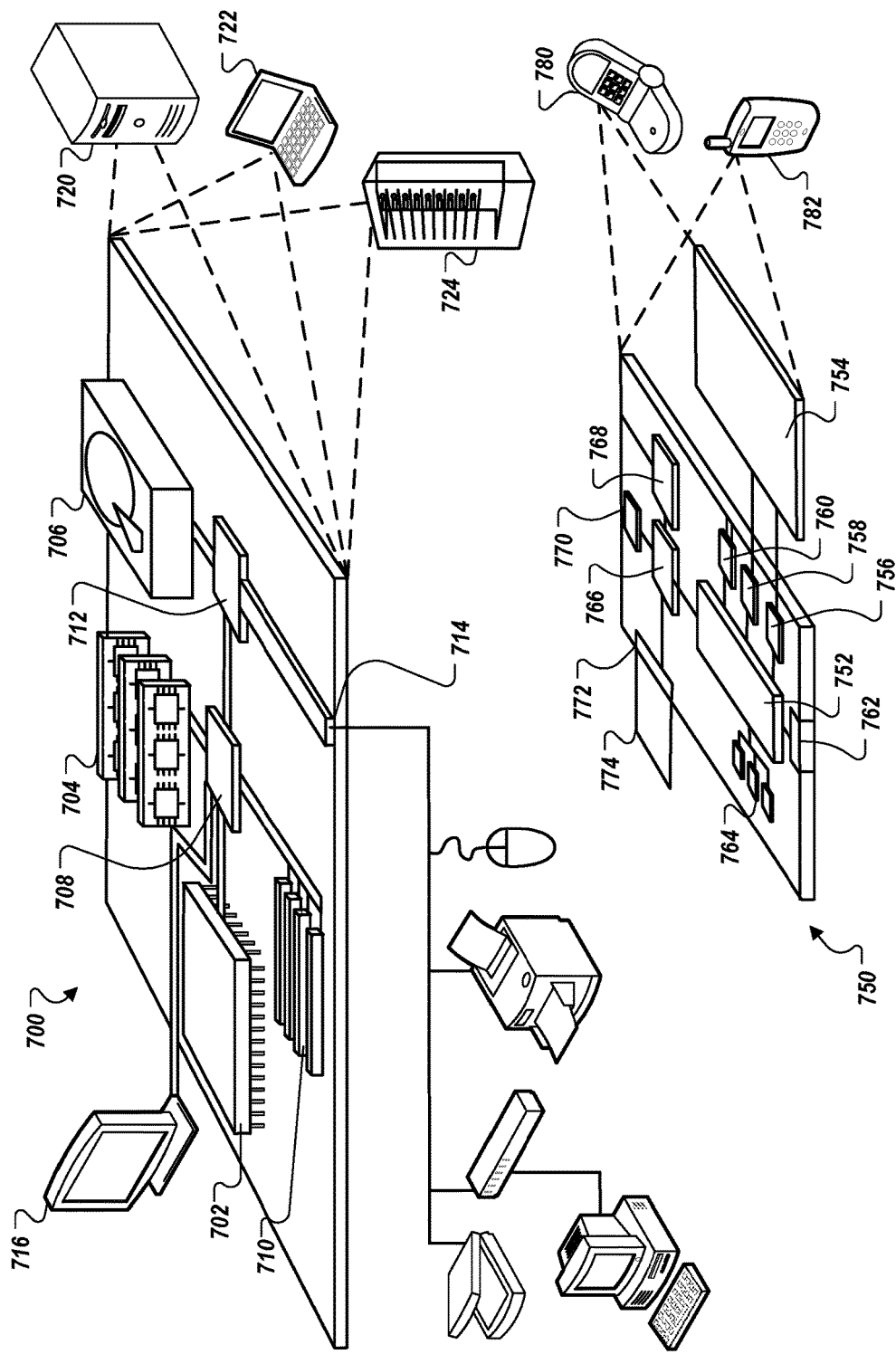
FIG. 7 is a block diagram of a computing system that can be used in connection with computer-implemented methods described in this specification.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 606, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716, e.g., through a graphics processor or accelerator, and to high-speed expansion ports 710, which may accept various expansion cards (not shown). In the implementation, low-speed controller 712 is coupled to storage device 706 and low-speed expansion port 714. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may include appropriate circuitry for driving the display 754 to present graphical and other information to a user.

The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication, e.g., via a docking procedure, or for wireless communication, e.g., via Bluetooth or other such technologies.

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750.

Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound, e.g., voice messages, music files, etc., and may also include sound generated by applications operating on device 750. The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product. apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component. e.g., as a data server, or that includes a middle-ware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments. a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

The invention claimed is:

1. A method comprising:
    receiving a voice input, from a user and at a computing device having at least one processor, while an aspect of dynamic content is being rendered for the user by the at least one processor;
    extracting, by the at least one processor, based on pattern data associated with the dynamic content and based on the aspect of the dynamic content being rendered, element data associated with the aspect;

generating a bookmark associated with the dynamic content based on pattern data and based on the voice input, wherein the bookmark comprises a static portion and a dynamic portion corresponding to the pattern data, and wherein the dynamic portion further corresponds to the element data associated with the aspect, and wherein the voice input includes one or more first words indicating a user intent to create the bookmark associated with the dynamic content and includes one or more second words indicating a name used to identify the bookmark; and storing, in association with the name used to identify the bookmark and by the at least one processor based on the generating of the bookmark, the bookmark in a bookmark index that is accessible by the at least one processor.

2. The method of claim 1, further comprising:
receiving, at the computing device, a second voice input including the name used to identify the dynamic bookmark;
rendering, by the at least one processor, the aspect, wherein the aspect is rendered based on the receiving of the second voice input and based on the dynamic portion of the bookmark corresponding to the element data associated with the aspect.

3. The method of claim 1, further comprising:
subsequent to storing the bookmark in the bookmark index:
identifying a second aspect of the dynamic content being rendered for the user by the at least one processor;
extracting, by the at least one processor, based on the pattern data associated with the dynamic content and based on the second aspect of the dynamic content being rendered, second element data associated with the second aspect; and
updating, by the at least one processor and based on the second element data associated with the second aspect, the dynamic portion of the bookmark in the bookmark index.

4. The method of claim 3, further comprising:
subsequent to updating the dynamic portion of the bookmark in the bookmark index:
receiving, at the computing device, a second voice input including the name used to identify the dynamic bookmark;
rendering, by the at least one processor, the second aspect, wherein the second aspect is rendered based on the second voice input and based on the dynamic portion of the bookmark corresponding to the second element data associated with the second aspect.

5. The method of claim 3, wherein the pattern data corresponds with a pattern, and the aspect of the dynamic content is capable of being rendered for the user at an initial instance in the pattern and the second aspect of the dynamic content is capable of being rendered for the user at a subsequent instance in the pattern.

6. The method of claim 1, wherein the element data comprises context data, device assist data, a transcription, an application identifier, and/or a resource identifier.

7. The method of claim 6, wherein the resource identifier is a deep link.

8. The method of claim 1, wherein the pattern data corresponds with a particular application associated with the dynamic content.

9. The method of claim 1, wherein the dynamic content comprises messages exchanged between the user and another user.

10. The method of claim 1, wherein the dynamic content comprises a videogame.

11. The method of claim 10, wherein the aspect is a particular level of the videogame and wherein the element data is a unique identifier corresponding to the particular level.

12. The method of claim 1, further comprising:
in response to receiving the voice input, rendering, by the at least one processor, an acknowledgement of the first words, the acknowledgment of the first words indicating that the computing device will create the bookmark.

13. The method of claim 10, further comprising:
in response to receiving the voice input, rendering, by the at least one processor, an acknowledgment of the second words, the acknowledgment of the second words indicating that the computing device will identify the bookmark in subsequently received voice inputs.

14. A system comprising:
one or more computers and one or more storage devices storing instructions that are operable, when executed by the one or more computers, to cause the one or more computers to perform operations comprising:
receiving a voice input, from a user and at a computing device having at least one processor, while an aspect of dynamic content is being rendered for the user by the at least one processor;
extracting, by the at least one processor, based on pattern data associated with the dynamic content and based on the aspect of the dynamic content being rendered, element data associated with the aspect;
generating a bookmark associated with the dynamic content based on pattern data and based on the voice input, wherein the bookmark comprises a static portion and a dynamic portion corresponding to the pattern data, and wherein the dynamic portion further corresponds to the element data associated with the aspect, and wherein the voice input includes one or more first words indicating a user intent to create the bookmark associated with the dynamic content and includes one or more second words indicating a name used to identify the bookmark; and
storing, in association with the name used to identify the bookmark and by the at least one processor based on the generating of the bookmark, the bookmark in a bookmark index that is accessible by the at least one processor.

15. The system of claim 14, the operations further comprising:
receiving, at the computing device, a second voice input including the name used to identify the dynamic bookmark;
rendering, by the at least one processor, the aspect, wherein the aspect is rendered based on the receiving of the second voice input and based on the dynamic portion of the bookmark corresponding to the element data associated with the aspect.

16. The system of claim 14, the operations further comprising:
subsequent to storing the bookmark in the bookmark index:
identifying a second aspect of the dynamic content being rendered for the user by the at least one processor;

extracting, by the at least one processor, based on the pattern data associated with the dynamic content and based on the second aspect of the dynamic content being rendered, second element data associated with the second aspect; and updating, by the at least one processor and based on the second element data associated with the second aspect, the dynamic portion of the bookmark in the bookmark index.

17. The system of claim 16, the operations further comprising:
subsequent to updating the dynamic portion of the bookmark in the bookmark index:
receiving, at the computing device, a second voice input including the name used to identify the dynamic bookmark;
rendering, by the at least one processor, the second aspect, wherein the second aspect is rendered based on the second voice input and based on the dynamic portion of the bookmark corresponding to the second element data associated with the second aspect.

18. The system of claim 16, wherein the pattern data corresponds with a pattern, and the aspect of the dynamic content is capable of being rendered for the user at an initial instance in the pattern and the second aspect of the dynamic content is capable of being rendered for the user at a subsequent instance in the pattern.

19. The system of claim 14, wherein the element data comprises context data, device assist data, a transcription, an application identifier, and/or a resource identifier.

20. The system of claim 19, wherein the resource identifier is a deep link.

* * * * *